US011334824B2

(12) United States Patent
Li et al.

(10) Patent No.: US 11,334,824 B2
(45) Date of Patent: May 17, 2022

(54) PHYSICAL RESOURCE OPTIMIZATION SYSTEM AND ASSOCIATED METHOD OF USE

(71) Applicant: The Curators of the University of Missouri, Columbia, MO (US)

(72) Inventors: Haitao Li, Columbia, MO (US); Ceki Halmen, Columbia, MO (US); Liu Yang, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 175 days.

(21) Appl. No.: 16/482,955

(22) PCT Filed: Feb. 1, 2018

(86) PCT No.: PCT/US2018/016369
§ 371 (c)(1),
(2) Date: Aug. 1, 2019

(87) PCT Pub. No.: WO2018/144687
PCT Pub. Date: Aug. 9, 2018

(65) Prior Publication Data
US 2020/0226518 A1    Jul. 16, 2020

Related U.S. Application Data

(60) Provisional application No. 62/454,511, filed on Feb. 3, 2017.

(51) Int. Cl.
*G06Q 10/00* (2012.01)
*G06Q 10/06* (2012.01)
(Continued)

(52) U.S. Cl.
CPC ....... *G06Q 10/06313* (2013.01); *G06Q 10/04* (2013.01); *G06Q 10/063118* (2013.01); *G06Q 50/165* (2013.01)

(58) Field of Classification Search
None
See application file for complete search history.

(56) References Cited

U.S. PATENT DOCUMENTS 3,736,409 A * 5/1973 Boyan ................ G06Q 10/06
235/376
4,414,661 A * 11/1983 Karlstrom ......... H04W 56/0025
370/332
(Continued)

FOREIGN PATENT DOCUMENTS

WO    2011/068794 A1    6/2011

OTHER PUBLICATIONS

Xie, Hua. "Improving Dynamic Project Control in Tunnel Construction." (2012). (Year: 2012).*
(Continued)

*Primary Examiner* — Gurkanwaljit Singh
(74) *Attorney, Agent, or Firm* — Thompson Coburn LLP

(57) ABSTRACT

A resource optimization system is offered for use in managing large scale projects. The resource optimization system has a resource optimization tool configured to receive a plurality of inputs. The plurality of inputs represent at least one task associated with the large scale project and are inputted into a resource optimization tool for a data processing procedure. An optimization module is contained within the resource optimization tool and configured to perform the data processing procedure on each of the plurality of inputs as well as exogenous disturbances inputted into the optimization module. The optimization module returns an optimization result based on the data processing procedure to reflect the management and progress of the project under evaluation.

19 Claims, 6 Drawing Sheets

(51) Int. Cl.
   *G06Q 10/04* (2012.01)
   *G06Q 50/16* (2012.01)

(56) References Cited

U.S. PATENT DOCUMENTS

| | | | | |
|---|---|---|---|---|
| 4,796,466 | A * | 1/1989 | Farmer | G01M 3/2807 73/49.1 |
| 4,956,875 | A * | 9/1990 | Bernard | G08B 27/008 455/526 |
| 5,784,540 | A * | 7/1998 | Faltings | G06N 20/00 706/46 |
| 6,076,049 | A * | 6/2000 | Lievois | G01N 33/2847 702/100 |
| 6,222,482 | B1 * | 4/2001 | Gueziec | G06F 16/29 342/357.34 |
| 6,243,483 | B1 * | 6/2001 | Petrou | F17D 5/00 382/103 |
| 6,611,755 | B1 * | 8/2003 | Coffee | H04W 56/0085 455/526 |
| 6,683,614 | B2 * | 1/2004 | Walls | G09G 5/363 345/506 |
| 6,868,340 | B2 * | 3/2005 | Alexander | A62B 99/00 711/100 |
| 6,920,618 | B2 * | 7/2005 | Walls | G06T 15/005 345/506 |
| 7,359,931 | B2 * | 4/2008 | Tarabzouni | G06F 16/29 709/200 |
| 7,584,165 | B2 * | 9/2009 | Buchan | G06Q 10/06 706/45 |
| 7,596,608 | B2 * | 9/2009 | Alexander | G16H 40/20 709/219 |
| 7,725,302 | B2 * | 5/2010 | Ayan | G05B 17/02 703/10 |
| 7,739,138 | B2 * | 6/2010 | Chauhan | G06Q 10/06 705/7.14 |
| 7,761,406 | B2 * | 7/2010 | Harken | G06F 16/254 707/602 |
| 7,809,537 | B2 * | 10/2010 | Hemanthkumar | G06Q 10/04 700/32 |
| 7,963,327 | B1 * | 6/2011 | Saleh | G06Q 10/06 702/9 |
| 7,996,150 | B2 * | 8/2011 | Nishida | G01C 21/26 701/472 |
| 8,121,716 | B2 * | 2/2012 | Offenmuller | G06Q 10/06 700/95 |
| 8,214,243 | B2 * | 7/2012 | Graham | G06Q 10/06312 705/7.22 |
| 8,914,267 | B2 * | 12/2014 | Brink | G06Q 10/06 705/7.14 |
| 9,342,806 | B2 * | 5/2016 | Urban | G06Q 10/063114 |
| 9,818,136 | B1 * | 11/2017 | Hoffberg | G07F 17/32 |
| 10,126,284 | B1 * | 11/2018 | Jenkins | F24D 19/1015 |
| 2002/0042700 | A1 * | 4/2002 | Giles | G06Q 10/06 703/6 |
| 2002/0069312 | A1 * | 6/2002 | Jones | G06Q 30/02 711/100 |
| 2002/0077953 | A1 * | 6/2002 | Dutta | G06Q 30/08 705/37 |
| 2002/0143469 | A1 * | 10/2002 | Alexander | A62B 99/00 702/2 |
| 2003/0093790 | A1 * | 5/2003 | Logan | H04N 21/26258 348/E7.071 |
| 2003/0212494 | A1 * | 11/2003 | Alexander | A62B 99/00 702/5 |
| 2003/0227392 | A1 * | 12/2003 | Ebert | G06Q 10/087 340/8.1 |
| 2004/0088113 | A1 * | 5/2004 | Spoonhower | G01M 3/005 702/185 |
| 2004/0145241 | A1 * | 7/2004 | Arakawa | B60R 25/102 340/5.2 |
| 2004/0148083 | A1 * | 7/2004 | Arakawa | G07C 5/085 701/50 |
| 2004/0198254 | A1 * | 10/2004 | Mizui | G08G 1/20 455/66.1 |
| 2004/0236620 | A1 * | 11/2004 | Chauhan | G06Q 10/06 705/7.14 |
| 2005/0119911 | A1 * | 6/2005 | Ayan | G01V 11/00 703/10 |
| 2005/0216324 | A1 * | 9/2005 | Maithell | G06Q 10/06 705/7.22 |
| 2005/0243604 | A1 * | 11/2005 | Harken | G06F 8/51 365/185.22 |
| 2006/0044307 | A1 * | 3/2006 | Song | G06T 11/206 345/419 |
| 2006/0074608 | A1 * | 4/2006 | Clay | G06Q 10/06 703/1 |
| 2006/0187017 | A1 * | 8/2006 | Kulesz | G08B 21/12 340/506 |
| 2007/0016389 | A1 * | 1/2007 | Ozgen | E21B 49/00 703/10 |
| 2007/0087756 | A1 * | 4/2007 | Hoffberg | G06Q 20/065 455/450 |
| 2007/0140239 | A1 * | 6/2007 | Bauer | H04L 29/12066 370/406 |
| 2007/0150327 | A1 * | 6/2007 | Dromgold | G06F 16/2477 705/7.17 |
| 2009/0024442 | A1 * | 1/2009 | Brink | G06Q 10/06314 705/7.22 |
| 2009/0024443 | A1 * | 1/2009 | Graham | G06Q 10/06 705/7.22 |
| 2009/0125367 | A1 * | 5/2009 | Brink | G06Q 50/02 705/7.41 |
| 2009/0150779 | A1 * | 6/2009 | Kodama | G06F 9/453 715/708 |
| 2010/0257106 | A1 * | 10/2010 | Iyer | G06Q 10/10 705/300 |
| 2010/0317420 | A1 * | 12/2010 | Hoffberg | G06Q 30/0207 463/1 |
| 2011/0055287 | A1 * | 3/2011 | Sun | G06Q 10/06 707/805 |
| 2012/0239169 | A1 | 9/2012 | Smith et al. | |
| 2014/0025610 | A1 * | 1/2014 | Fox | G06Q 10/06313 706/13 |
| 2014/0032255 | A1 * | 1/2014 | Hegazi | G06Q 10/06312 705/7.22 |
| 2014/0244329 | A1 * | 8/2014 | Urban | G06Q 10/063114 705/7.15 |
| 2014/0350984 | A1 * | 11/2014 | Mitti | G06Q 10/063118 705/7.17 |
| 2015/0009013 | A1 | 1/2015 | Cartwright et al. | |
| 2015/0066548 | A1 * | 3/2015 | Salvaggio | G06Q 10/063 705/7.11 |
| 2015/0246794 | A1 | 9/2015 | Casassa et al. | |
| 2016/0132804 | A1 * | 5/2016 | Croft | G06Q 10/06313 705/7.23 |
| 2016/0195289 | A1 | 7/2016 | Matsuoka et al. | |
| 2016/0260048 | A1 * | 9/2016 | Uerbach | G06Q 30/04 |
| 2016/0335731 | A1 * | 11/2016 | Hall | G06Q 10/067 |
| 2016/0364099 | A1 | 12/2016 | Santos-Gomez | |
| 2017/0006135 | A1 | 1/2017 | Siebel et al. | |
| 2017/0343695 | A1 * | 11/2017 | Stetson | G01V 3/101 |
| 2018/0238820 | A1 * | 8/2018 | Ghods | G01M 5/0083 |

OTHER PUBLICATIONS

Kostelyk, Jesse D. "Project controls for engineering work in practice." (2012). (Year: 2012).*

Mohamed, A. H. (2016). Lean construction as an innovative approach for minimising risks in mega-construction projects in the kingdom of saudi arabia (Order No. 28469685). Available from ProQuest Dissertations and Theses Professional. (2566014798) (Year: 2016).*

Tate, Peter, and Peter Farrell. "Project management: complex mathematical model." Arcom Doctoral Workshop. 2008. (Year: 2008).*

Morris, Peter WG. "Implementing strategy through project management: The importance of managing the project front-end." Making essential choices with scant information. Palgrave Macmillan, London, 2009. 39-67. (Year: 2009).*

(56) References Cited

OTHER PUBLICATIONS

Chassiakos et al., "Time-Cost Optimization of Construction Projects with Generalized Activity Constraints", Journal of Construction Engineering and Management, Oct. 2005, pp. 1115-1124.

Gutjahr et al., "A Stochastic Branch-and-Bound Approach to Activity Crashing in Project Management", INFORMS Journal on Computing, 2000, pp. 125-135, vol. 12, No. 2.

International Search Report and Written Opinion for PCT/US2018/016369 dated Apr. 6, 2018.

Ke et al., "Optimization Models and a GA-Based Algorithm for Stochastic Time-Cost Trade-Off Problem", Applied Mathematics and Computation, 2009, pp. 308-313, vol. 215.

Klansek, "Mixed-Integer Nonlinear Programming Model for Nonlinear Discrete Optimization of Project Schedules Under Restricted Costs", Journal of Construction Engineering and Management, Mar. 2016, vol. 142, No. 3.

Laslo, "Activity Time-Cost Tradeoffs Under Time and Cost Chance Constraints", Computers & Industrial Engineering, 2003, pp. 365-384, vol. 44.

Liu et al., "Construction Time-Cost Trade-Off Analysis Using LP/IP Hybrid Method", Dec. 1995, pp. 446-454.

Machczynska et al., "DNA Methylation Changes in Triticale Due to In Vitro Culture Plant Regeneration and Consecutive Reproduction", Plant Cell Tiss Organ Cult, Jun. 2014, pp. 289-299, vol. 119.

Moussourakis et al., "Flexible Model for Time/Cost Tradeoff Problem", Journal of Construction Engineering and Management, Jun. 2004, pp. 307-314.

Palauqui et al., "Systemic Acquired Silencing: Transgene-Specific Post-Transcriptional Silencing is Transmitted by Grafting from Silenced Stocks to Non-Silenced Scions," The EMBO Journal, 1997, pp. 4738-4745, vol. 16 No. 15.

Son et al., "A Mixed (Continuous + Discrete) Time-Cost Trade-Off Model Considering Four Different Relationships wtih Lag Time", KSCE Journal of Civil Engineering, 2013, pp. 281-291.

Wollmer, "Critical Path Planning Under Uncertainty", Mathematical Programming Study, 1985, pp. 164-171, vol. 25.

Zhang et al., "A Trade-Off Between Time and Cost in Scheduling Repetitive Construction Projects", Journal of Industrial and Management Optimization, Oct. 2015, pp. 1423-1434, vol. 11, No. 4.

\* cited by examiner

PHYSICAL RESOURCE OPTIMIZATION SYSTEM AND ASSOCIATED METHOD OF USE

CROSS-REFERENCE TO RELATED APPLICATIONS

This application is a U.S. National Phase application of PCT/US2018/016369, filed on Feb. 1, 2018, claiming the benefit of U.S. Provisional Application No. 62/454,511, filed on Feb. 3, 2017, both of which are incorporated herein by reference in their entireties.

BACKGROUND OF THE INVENTION

The end goal of any commenced project is completion. Thus, for example, if a person attempts to drive to a location, that task would be completed once the person arrives at his or her destination. Various projects are attempted and started all over the world, at different times, and with different degrees of difficulty required for completion. Depending on the difficulty of the project, more and more tasks must be completed until the project is deemed finished. Furthermore, based on the complexity of the tasks associated with the project, a person may find outside tracking devices advantageous to determine how the completion of the project is faring.

A project may be simple in nature (e.g., drive from one location to another) or extremely complex (e.g., designing and launching a satellite into orbit). For example, in complex projects, multiple subtasks may exist which must be completed to achieve the end result. These complex projects involve multiple teams, outside entities, outside materials, and timelines, which are needed to be managed and overseen so that the project is progressing towards completion. Thus, many complex projects provide a manager position or a managing team to oversee the intricacies and completion of the subtasks needed to complete the project.

One area where use of project managers and project managing teams is useful is in the management of complex construction projects. With construction projects, large numbers of laborers are needed and managed for the completion of various subtasks. These laborers are not always from the same organization as multiple subcontractors are usually employed during construction projects, and especially on those construction projects requiring a large variety of skilled disciplines. Furthermore, the company awarded the construction project will be responsible for managing the costs affiliated with these large workforces as well as the laborers used to complete the project. Timelines for completion are crucial to the overall success and completion of these construction projects. The main contractor is additionally responsible for overseeing these deadlines and making sure that the project is being adequately advanced to a predetermined completion date.

With all these added responsibilities, project managers and project management teams have enlisted the aid of outside resources to make sure all these multiple deadlines and costs can be tracked. This is done not only to ensure work is being completed on the project but to also ensure that work is being completed under the appropriate budgeting constraints and to the satisfaction of the hiring client. Thus, project managers and project management teams enlist the help of resource distribution and scheduling tools to accomplish these needs. Currently available resource distribution and scheduling tools focus solely on two areas of project management: a critical path to completion of the project; and allocating resources for on-time completion of the project. While important, solely focusing on these two areas of project management neglect other important considerations and data projections which would not only lead to a better evaluation of a proposed critical path, but also a better allocation of physical resources to achieve an on time completion date.

Against this backdrop, the inventors believe that new and innovative techniques are needed to improve upon existing resource distribution and scheduling tools to create a resource optimization system indicative of the actual issues and problems associated with completing large scale projects.

SUMMARY OF THE INVENTION

To address these needs, the inventors developed a resource optimization system, which can be used with large scale management projects to focus on optimizing an ideal rate of return for the physical and controllable resources employed within the framework of these large scale projects. Utilizing controllable physical resources, the inventive resource optimization system optimizes variable cash flows, variable task durations, variable rates of billing, review periods, and payment schemes and schedules to determine the optimal path and projected course of a project until completion.

To achieve such results, the inventors disclose illustrative embodiments where the resource optimization system is used to facilitate optimal management of a project. In one embodiment of the present disclosure, a resource optimization tool is used for management purposes. The resource optimization tool has a plurality of inputs identified as requirements to complete a project. Each of the plurality of inputs is representative of at least one task associated with the project and inputted into the resource optimization tool. An optimization module is configured to perform a first data processing procedure on a task data component of each of the plurality of inputs. The optimization module returns a first optimization result based on the first data processing procedure. Furthermore, an exogenous disturbance is inputted into the optimization module. The exogenous disturbance is a quantifiable event directly effecting at least one task of the plurality of inputs associated with the project. The optimization module performs a second data processing procedure on the exogenous disturbance and returns a second optimization result based on the second data processing procedure.

In another illustrative, but nonlimiting, embodiment of the present disclosure, a resource optimization system is offered for use in managing large scale projects. The resource optimization system has a resource optimization tool configured to receive a plurality of inputs identified as requirements to complete the large scale project. Each of the plurality of inputs being representative of at least one task associated with the large scale project and inputted into the resource optimization tool for a first data processing procedure. A task data component of each of the plurality of inputs is used, the task data component being a physically quantifiable value of the task relating to either a monetary cost, a time requirement, or a labor requirement. An optimization module is contained within the resource optimization tool and configured to perform the first data processing procedure on the task data component of each of the plurality of inputs received by the resource optimization tool. The optimization module returns a first optimization result based on the first data processing procedure of the task data components. Further, an exogenous disturbance is inputted into the optimization module within the resource optimization tool. The exogenous disturbance is a quantifiable event directly effecting at least one task of the plurality of inputs associate with the large scale project. The exogenous disturbance relates to either the monetary cost, the time requirement, or the labor requirement of the quantifiable event. A second data processing procedure is performed on the exogenous disturbance returning a second optimization action. A graphical user interface (GUI) communicates with the resource optimization tool to allow an end user the ability to access, view, and edit the resource optimization tool as well as access, view, and edit the plurality of inputs, the graphical user interface is further able to receive and display each the first optimization result and the second optimization result to the user accessing the graphical user interface.

Additionally, another illustrative, but nonlimiting, embodiment addressing optimization of the workflow of a large scale project is disclosed. In such an embodiment, a user accessed a resource optimization system through a graphical user interface. A plurality of inputs is then entered, identifying requirements to complete the large scale project, into the resource optimization system. A task data component of each of the plurality of inputs is received within a resource optimization tool of the resource optimization system. A first data processing procedure is executed on the task data component with an optimization module of the resource optimization tool. The optimization module returns a first optimization result based on the first data processing procedure. Then, an exogenous disturbance is entered into the resource optimization tool along with the plurality of inputs. The exogenous disturbance is a quantifiable event directly effecting at least one task of the plurality of inputs. A second data processing procedure is executed on the exogenous disturbance within the optimization module. The optimization module returns a second optimization result based on the second data processing procedure. Finally, each the first optimization result and the second optimization result are displayed on the graphical user interface and accessible by the user.

Further features and advantages of the disclosed embodiments, as well as the structure and operation of various elements of the disclosed embodiments, are described in detail below with reference to the accompanying drawings and figures.

BRIEF DESCRIPTION OF THE DRAWINGS

The accompanying drawings, which are incorporated in and form a part of the specification, illustrate the disclosed embodiments and together with the description, serve to explain certain inventive principles. In the drawings.

DETAILED DESCRIPTION OF EXAMPLE EMBODIMENTS

Figure 1:
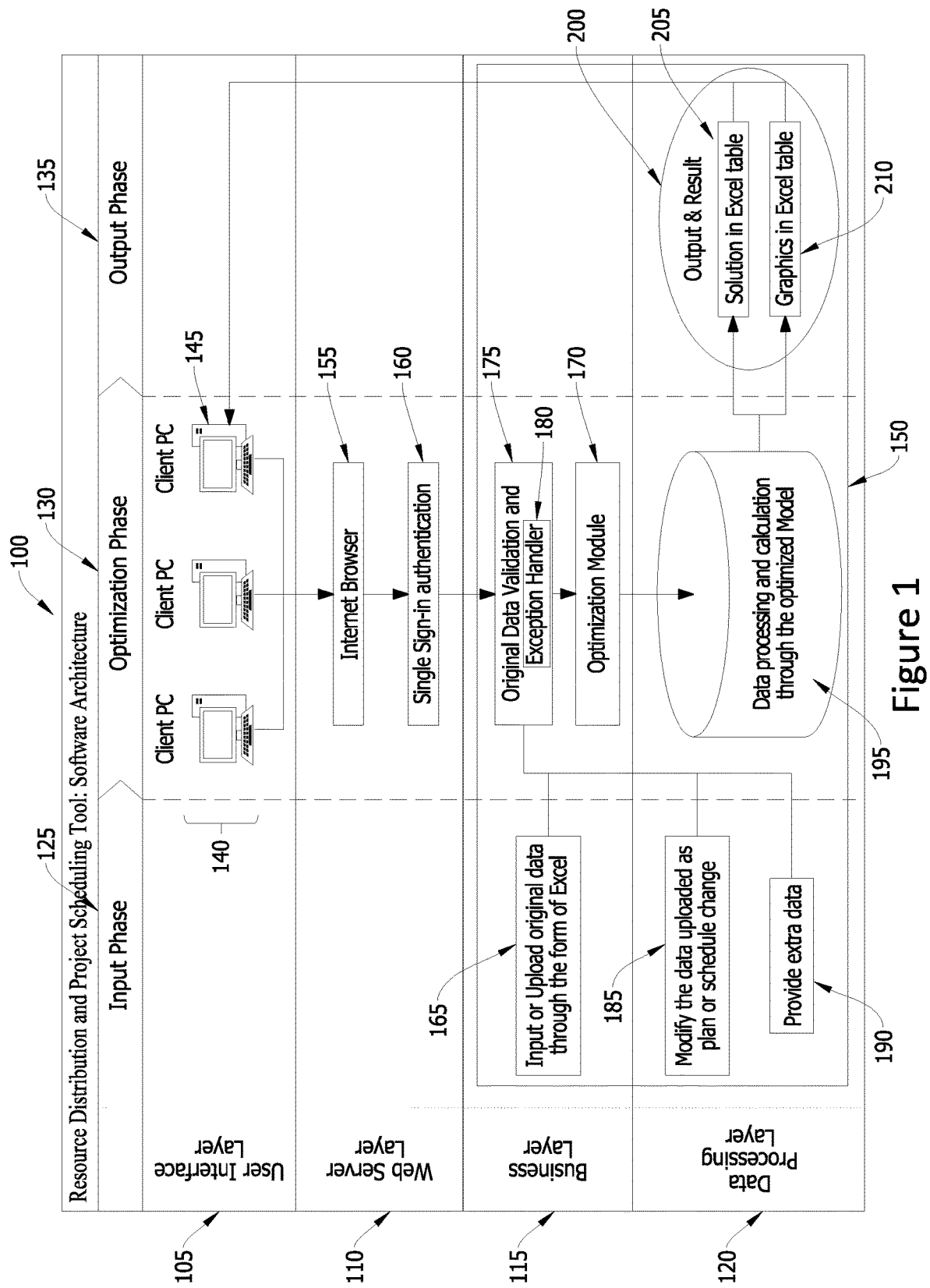
FIG. 1 illustrates a interactive view of the components of the resource optimization system according to an example embodiment.

Referring to the accompanying drawings in which like reference numbers indicate like elements, FIG. 1 illustrates a high level view of a resource optimization system 100, which may be used to manage the process and status of a large scale projection. As stated above, the disclosed resource optimization system 100 is to be used as a management aid for individuals associated with a project or assignment. The disclosed resource optimization system 100 allows, among other advantages, for maximized efficiency in allocated resources, an optimized and beneficial supply chain design, and managing the logistics essential in minimizing costs of a project while keeping the project on the correct timeline for completion. The disclosed resource optimization system 100 may be employed in an industry or personal setting where management of a project, project costs, and deadlines are of the upmost importance. Such industries include, but are not limited to areas of construction management, pharmaceutical research and development management, oil and project management, militaristic operation management, general supply chain management for a company or consumer, and logistics management of a company's resources. Resource management in these industries and other large scale projects run into similar problems. These challenges include: 1) cost over-runs as resources are not optimally allocated for project tasks; 2) uncertainty in task duration caused by variations in crew productivity; and 3) difficulty of scheduling payments to meet complex payment terms of these large scale projects. The disclosed resource optimization system 100 is envisioned to save additional time and money by addressing these concerns, which are not addressed with the current state of project management technology.

FIG. 1 shows a hierarchical view of the resource optimization system 100. The resource optimization system 100 can be subdivided into four distinct layers: 1) a user interface layer 105, 2) a web server layer 110, 3) a business layer 115, and 4) a data processing layer 120. Additionally, the resource optimization system 100 can be subdivided based on the nature or activities occurring within each of these layers. For example, and as viewed in FIG. 1, the resource optimization system 100 may have an input phase 125, an optimization phase 130, and an output phase 135. The output phase 135 may also have the ability to generate reports. While FIG. 1 provides an example embodiment of the resource optimization system 100, other configurations and subdivisions may exist which allow the resource optimization system 100 to operation in the same manner.

The highest layer of the resource optimization system 100 is the user interface layer 105. Within the user interface layer 105 a plurality of personal computing devices 140 may connect to the optimization phase 130 of the resource optimization system 100. These personal computing devices 140 may include, but are not limited to, terminal personal computer stations, laptops, computing tablets, smartphones, or any other device with the ability to connect to a network. An end user may access these personal computing devices 140 which can contain a graphical user interface (GUI) allowing the end user to access and receive information for deeper layers of the resource optimization system 100. As stated above, large scale projects employ a large labor force. FIG. 1 represents the accessible nature of the resource optimization system 100 to a project manager being the end user. The project manager in this example is responsible for maintaining and ensuring the scheduled project complies with the deadlines and budget allocated for the project. In other embodiments, the plurality of personal computing devices 140 may also connect to the input phase 125 of the resource optimization system 100 where a project manager can input new task data, which may or may not affect the overall progress of the project. Further the plurality of personal computing devices 140 may be located in multiple locations both on and offsite of the project. In some examples, the project manager may be employed on the project site where he/she may access a local personal computing terminal to enter the resource optimization system 100. In other examples, the project manager, or project management team, may be located in a back office, offsite, such as a corporate office. Still in other embodiments, the project manager, may access the resource optimization system 100 remotely through the course of travel with use of a personal computing device 145 such as a smartphone, tablet, or laptop. Regardless of the location of the project manager or project management team, the plurality of personal computing devices 140 must have networking capabilities to allow the project manager or project management team access to the resource optimization system 100.

Below the user interface layer 105, a web server layer 110 exists within the resource optimization system 100. The web server layer 110 provides a server function to which a project manager or project managing team can connect with one of the plurality of personal computing devices 140 allowing the end user access to the resource optimization tool 150 located within the lower layers. The plurality of personal computing devices 140 can connect to the resource optimization tool 150 through a number of different electronic connections. Web server layer 110 may be a local area network (LAN) to which each the plurality of personal computing devices 140 and the resource optimization tool 150 are connected. In other examples the web server layer 110 may be an offsite server or extranet function to which the project manager or project management team may connect to the resource optimization tool 150. Within the web server layer 110, an end user on the plurality of personal computing devices 140 may access an internet browser 155. This provides increased functionally of the resource optimization system 100 as the project manager or project management team are not required to be connected to a local area network onsite near the stored resource optimization tool 150. After accessing the internet browser 155, the end user on the personal computing device 145 can access the resource optimization tool 150 located remotely on a server either through a direct login or extranet service. Regardless of how access to the server containing the resource optimization tool 150 is obtained, a sign-in authentication 160 will prompt when an end user on one of the plurality of personal computing devices 140 attempts to connect. The sign-in authentication 160 provides security of the resource optimization tool 150 in the form of a protected word, digital code, or smart identification (i.e. thumbprint on a smartphone), which is required to be entered by the end user before accessing the resource optimization tool 150. In some embodiments, the sign-in authentication 160 may be a single sign-in authentication meaning a common sign-in authentication for all permitted accessible material granted to the end user on the personal computing device 145. If an incorrect answer is provided with the sign-in authentication 160 the end user will not be able to access the resource optimization tool 150. If however the correct answer is provided with the sign-in authentication 160, the end user will proceed to the resource optimization tool 150 of the resource optimization system 100.

Below the web server layer 110, a business layer 115 of the resource optimization system 100 exists. The business layer 115 is one part of the resource optimization tool 150 used within the resource optimization system 100. The resource optimization tool 150 is present within both the input phase 125 and the optimization phase 130 of the resource optimization system 100.

In the input phase 125, a plurality of inputs 165 are present within the business layer 115. This plurality of inputs 165 are identified as requirements to complete the overall project governed by the resource optimization system 100. Each of the plurality of inputs 165 can then be subdivided into at least one task associated with the overall project. The plurality of inputs 165 may be manually inputted by an end user (in some embodiments the project manager or project management team) accessing the resource optimization tool 150 through the plurality of personal computing devices 140. The plurality of inputs 165 may also be uploaded into the resource optimization tool 150 as a file format readable by the resource optimization tool 150. In one such example, this file format may take on a tabular shape and be expressed as a Microsoft® Excel file. Once the plurality of inputs are entered into the business layer 115, the information contained with these plurality of inputs 165 is transmitted to the optimization phase 130 of the resource optimization system 100 for additional processing by the resource optimization tool 150.

As seen below in example Table 1, the plurality of inputs 165 is viewed as a list of tasks associated with completing the project of constructing a bridge.

TABLE 1

Tasks in the Example Bridge Construction Project.

| Task | Description | Crew | Equipment | Duration (days) |
|------|-------------|------|-----------|-----------------|
| 1 | Shop drawings: abutment-deck steel | Fabricator | | 10 |
| 2 | Shop drawings: footings steel | Fabricator | | 5 |
| 3 | Move in | — | | 3 |
| 4 | Deliver piles | — | | 15 |
| 5 | Shop drawings: girders | Fabricator | | 10 |
| 6 | Deliver footings steel | — | | 7 |
| 7 | Make abutment forms | Carpenters | | 4 |
| 8 | Excavate abutment 1 | Laborer | | 4 |
| 9 | Drive piles abutment 1 | Equip. Oper. (med) | Dozer, 80 H.P. | 3 |
| 10 | Excavate abutment 2 | Laborer | | 1 |
| 11 | Deliver abutment and deck steel | Pile Driver Foreman | Crawler Crane, 40 Ton | 15 |
| 12 | Forms and steel footing 1 | Pile Drivers | Lead, 90' high | 3 |
| 13 | Drive piles abutment 2 | Equip. Oper. (crane) | Hammer, Diesel, 22k ft-lb | 4 |
| 14 | Pour footing 1 | Equip. Oper. Oiler | | 1 |

TABLE 1-continued

Tasks in the Example Bridge Construction Project.

| Task | Description | Crew | Equipment | Duration (days) |
|---|---|---|---|---|
| 15 | Strip footing 1 | Equip. Oper. (med) | Dozer, 80 H.P. | 1 |
| 16 | Forms and steel abutment 1 | Laborer | | 5 |
| 17 | Forms and steel footing 2 | — | | 2 |
| 18 | Pour abutment 1 | Carpenters | | 1 |
| 19 | Pour footing 2 | Laborer | | 1 |
| 20 | Strip and cure abutment 1 | Rodmen (Reinforcing) | | 3 |
| 21 | Strip footing 2 | Pile Driver Foreman | Crawler Crane, 40 Ton | 1 |
| 22 | Saw abutment 1 | Pile Drivers | Lead, 90' high | 14 |
| 23 | Forms and steel abutment 2 | Equip. Oper. (crane) | 2Hammer, Diesel, 22k ft-lb | 5 |
| 24 | Pour abutment 2 | Equip. Oper. Oiler | | 1 |
| 25 | Strip and cure abutment 2 | — | | 2 |
| 26 | Deliver girders | Labor Foreman | Gas Engine Vibrators | 25 |
| 27 | Saw abutment 2 | Laborer | Concrete Pumps | 7 |
| 28 | Set girders | Cement Finisher | | 6 |
| 29 | Forms and steel deck | Equip. Oper. (med) | | 5 |
| 30 | Rub concrete abutment 1 | — | | 2 |
| 31 | Pour and cure deck | Carpenters | | 1 |
| 32 | Rub concrete abutment 2 | Laborer | | 4 |
| 33 | Strip deck forms | Rodmen (Reinforcing) | | 4 |
| 34 | Saw contraction joints | Carpenters | | 2 |
| 35 | Painting | Laborer | | 1 |
| 36 | Guardrail | Rodmen (Reinforcing) | | 2 |
| 37 | Clean up | — | | 2 |
| 38 | Inspection | Labor Foreman | Gas Engine Vibrators | 1 |

The plurality of inputs 165 may include the tasks associated with the project listed in a sequential order. In Table 1, thirty-eight tasks are present which are needed to complete a bridge. Each individual task may be viewed in a tabular form having additional columns of information relating to each of the numbered tasks. For example, each task may be provided with a column indicating a description of the numbered task (or description of the work needed to be completed). Additionally, a column of the tabular form may contain a labor requirement of the task indicating what type of employees/laborers is needed to complete the representative task. An equipment requirement may also be present in another column representing the type of machinery or physical devices that are needed to complete the representative task. In some illustrated examples, the equipment requirement may include, but is not limited to, use of a pile driver, a crane, a bulldozer, a gas engine vibrator, or a concrete pump on the construction site. In other embodiments other physical machinery may be added or removed based on the requirements of the project. In addition, another column may be present in the tabular form indication a time requirement, or more specifically, a timed duration of the representative task for completion. Furthermore, additional columns may be present to include other relevant information such as but not including, a cost requirement for the budgeted task, an actual cost as of the time the task was inputted into the tabular form, a supervisor/contractor requirement identifying the lead individual or company on the sequenced task, or a general note column indicating special or specific relevant information for the representative task. Each cell of the tabular format can then be converted into a task data component representing the data contained within each of the cells. These task data components can then be sent to the optimization phase 130 of the resource optimization system 100 for additional processing applications.

In the optimization phase 130 of the business layer 115 the optimization module 170 is present. The optimization module 170 receives the task data components of the plurality of inputs 165 and processes these task data components to produce an optimization result representative of the ideal course of action to manage and optimize the resources of the project. Before entering the optimization module 170, the task data components are entered into a data validation module 175. Within the data validation module 175, the information received from the plurality of inputs 165 in the task data component form is verified and assessed as to the correctness of the data. Thus, if task data components for a specific task are inputted incorrectly or missing, the data validation module 175 will determine such errors and notify the end user accessing the resource optimization system 100 through the personal computing device 145. At that time the end user may have the ability to correct the data within the plurality of inputs 165 so that the corrected task data components are transmitted to the optimization module 170. Further, the data validation module 175 may also contain and exception handler 180. The exception handler 180 may verify specific task data components identified by the end user, which should not be used within the optimization module 170 for calculation and optimization purposes. An end user accessing the resource optimization system 100 through a personal computing device 145 may input an exception identifier into the exception handler 180 regarding a specific task data component obtained from the plurality of inputs 165. The exception handler 180 will then omit the inclusion of those specific task data components, which meet the exception identifier from calculations performed by the optimization module 170. If the data validation module 175 correctly determines that the task data components transferred from the input phase 125 are indeed sufficient and that the any exception identifiers are correctly screen by the exception handler 180, the task data components are transferred into the optimization module 170 for additional processing.

The optimization module 170 itself is a unique combination of comparable relationships between quantifiable activities or events, which can be evaluated to give an accurate assessment of the status of a project. The optimization module 170 is configured to obtain the maximum rate of return for a project or task of the project and output the optimized result to the end user. The optimization module 170 is created by determining multiple relationships between the task data components contained in the plurality of inputs 165. The task data components may be organized as a series of sets. These sets may include, but are not exclusive of, 1) a set of project activities, 2) a set of precedence relationships, 3) a set of options, 4) a set of months, and 5) a status and finish time of a representative task. Further, the optimization module 170 is broken down into parameters representing a physically quantifiable event relating to the completion of the project to be optimized. Examples of such parameters include, but are not exclusive of: 1) the duration of an activity when taking an option; 2) the cost of an activity when taking an option; 3) project deadlines; 4) monthly interest rates; 5) total contract value; 6) daily indirect cost; 7) markup percentage of cost; and 8) agreed proportion of monthly payment to total monthly invoice. The optimization module 170 also includes multiple decision variables. These decision variable results are obtained if a qualifying event occurs in a set of determined conditions (e.g., if activity X takes option Y and finishes in month Z). More decision variables can be seen in Table 2 included below.

As stated above, the goal of the optimization module 170 is to provide a maximum rate of return on the physical requirements (i.e., time, money, labor, etc.) of a task to therefore provide the maximum rate of return on the entire optimized project. To accomplish this, the optimization module 170 maximizes the following equation.

Objective Function $$\text{Maximize } \Sigma_{k \in M} \text{Net}_k/(1+r)^k \quad (1)$$

To determine the above maximized result, the optimization module 170 utilizes a series of constraints in combination with the sets, parameter, and decision variables. Table 2 provides a detailed view of each the sets, parameters, decisions variables, object functions of the optimization module 170, and constraints.

TABLE 2

Module Formulation

Sets

A: set of project activities
E: set of precedence relationships
N: set of options
M: set of months
B: {status, finishtime}

Parameters

| | |
|---|---|
| $\text{dur}_{ij}$: duration (in days) of activity i when taking option j | $i \in A \quad j \in N$ |
| $\widetilde{cost}_{ij}$ : direct cost of activity i when taking option j | $i \in A \quad j \in N$ |

T: project deadline (in days)
r: monthly interest rate
Π: total contract value
ρ: daily indirect cost ($ per day)
ψ : markup (% of total cost)
β: agreed proportion of monthly payment to total monthly invoice (%)

Objective function

| | |
|---|---|
| Maximize $\Sigma_{k \in M} \text{Net}_k/(1 + r)^k$ | (1) |

Constraints

| | | |
|---|---|---|
| s.t. | | |
| $\Sigma_{j \in N} \Sigma_{k \in M} x_{ijk} = 1$ | $\forall i \in A$ | (2) |
| $p_i = \Sigma_{j \in N}((\Sigma_{k \in M} x_{ijk}) \times \text{dur}_{ij})$ | $\forall i \in A$ | (3) |
| $c_{ik} = \Sigma_{j \in N}(x_{ijk} \times \widetilde{cost}_{ij})$ | $\forall i \in A, k \in M$ | (4) |
| $SF_i - p_i \geq 0$ | $\forall i \in A$ | (5) |
| $SF_i - p_j - SF_j \geq 0$ | $\forall (i,j) \in E$ | (6) |
| $SF_n \leq T$ | | (7) |
| $SF_i \leq \Sigma_{k \in M}(\Sigma_{j \in N} x_{ijk}) \times k \times 30$ | $\forall i \in A$ | (8) |
| $SF_j + 29 \geq \Sigma_{k \in M}(\Sigma_{j \in N} x_{ijk}) \times k \times 30$ | $\forall i \in A$ | (9) |
| $SF_n - 30 \times (k - 1) \leq y_k \times T$ | $\forall k \in M$ | (10) |
| $SF_n - 30 \times (k - 1) \geq (y_k - 1) \times m * 30$ | $\forall k \in M$ | (11) |
| $MIC_k \leq 30 \times y_k \times \rho$ | $\forall k \in M$ | (12) |
| $MIC_k \leq (SF_n - 30 \times y_k \times (k - 1)) \times \rho$ | $\forall k \in M$ | (13) |
| $\Sigma_{k \in M} MIC_k = SF_n \times \rho$ | | (14) |
| $MC_k = \Sigma_{i \in A} c_{ik} + MIC_k$ | $\forall k \in M$ | (15) |
| $IR_1 = MC_1 \times r$ | | (16) |
| $IR_2 = MC_2 \times r + (MC_1 + IR_1) \times r$ | | (17) |
| $IR_k = (\Sigma_{\tau=1}^{k-1} IR_\tau + \Sigma_{\tau=1}^{k} MC_\tau - \Sigma_{\tau=1}^{k-1} IN_\tau - \Sigma_{\tau=1}^{k-1} \pi_\tau) \times r$ | $k \in \{3..m\}$ | (18) |
| $IN_1 = 0$ | | (19) |
| $IN_k \leq MC_{k-1} \times (1 + \psi) \cdot \beta$ | $k \in \{2..m\}$ | (20) |
| $TIN = \Sigma_{k \in M} IN_k$ | | (21) |
| $TIN \leq \Pi$ | | (22) |
| $\pi_1 = 0$ | | (23) |
| $\pi_k \leq \Sigma_{j \in N} x_{nj \, (k-1)} \times \Pi$ | $k \in \{2..m\}$ | (24) |
| $\pi_k \leq \Pi - TIN$ | $k \in M$ | (25) |
| $Net_k = IN_k + \pi_k - MC_k - IR_k$ | $k \in M$ | (26) |
| $x_{ijk}, y_k \in \{0, 1\}$ | | (27) |
| $p_i, c_{ik}, SF_i, MIC_k, MC_k, IR_k, TIN, IN_k, \pi_k, Net_k \geq 0$ | | (28) |

The objective function (1) maximizes the total discounted NPV of the project. Constraint (2) assigns exactly one option to an activity, and exactly one month for the activity to finish. That is, no preemption is allowed (once an activity is started, it cannot be interrupted). Constraints (3) and (4) compute the duration (in days) and cost of each activity, respectively, based on the option chosen. In (4), we assume that the direct cost always incur during the month in which the activity is completed. Constraint (5) ensures that each activity's starting time is no less than zero. Constraint (6) satisfies the precedence relationship between a pair of activities (i,j), i.e. activity j cannot start until activity j is completed. Constraint (7) guarantees that the project is completed by the given deadline T (in days). Constraints (8) and (9) together establish the relationship between the scheduled finish time SF (in days) and the binary decision variable x (in months). Constraints (10) and (11) together identify whether the project is active in each month. Constraint (12)-(14) compute the monthly indirect cost. Specifically, Constraint (12) states that a monthly indirect cost is only incurred when the project is active in that month. Constraint (13) ensures the correct computation for the ending of the project. Constraint (14) makes sure that the total indirect costs over all active months equal to the project make span (in days) multiply by the daily overhead cost rate. Constraint (15) computes the total monthly cost as the summation of total monthly direct cost of all activities completed in that month, and the monthly indirect cost.

Constraints (16)-(18) computes the interests paid in Month 1, Month 2 and the following months, respectively. Constraint (19) fixes the Month 1 cash inflow to be zero. Constraint (20) specifies that the payment (cash inflow) of a month (starting from Month 2) cannot exceed a proportion $\beta$ of the total cost of the previous month augmented by a markup rate $\psi$. Constraint (21) obtains the total payment received, and Constraint (22) makes sure that it does not exceed the contract value. Constraints (23)-(25) together identify the remaining of account receivable at the project completion time. Constraint (26) computes the net income of a month. Constraints (27) and (28) specify the domain of binary and continuous decision variables, respectively.

Returning now to FIG. 1, the fourth layer of the resource optimization system 100 is viewed as the data processing layer 120. The data processing layer 120 is the second layer of the resource optimization tool 150. The data processing layer 120 contains objectives within each the input phase 125, the optimization phase 130, and the output phase 135. Within the input phase 125 of the data processing layer 120 a data modification event 185 may be added to the resource optimization tool 150. The data modification event 185 relates to a change in the task data components contained within the plurality of inputs 165. In some examples, the data modification event 185 may be a schedule change, or a plan change, referencing a change to the amount to time allotted for a completion of a task within the project. In other instances the data modification event 185 may be a change of cost for the completion of the required event. Other embodiments may input the data modification event 185 as a change in contractor, a change in equipment, or a change in a description of the task as possible other alternatives. An end user such as a project manager or the project managing team may access the resource optimization system 100 through the plurality of personal computing devices 140 to enter the change in data needed for the data modification event 185. The newly changed data of the data modification event 185 is then sent to the data validation module 175 to validate the correctness of the newly entered modification.

Also within the input phase 125 of the data processing layer is an extra data event 190. The extra data event 190 allows the end user (either a project manager or project management team), accessing the resource optimization system 100 through the plurality of personal computing devices 140, and the ability to enter new data into the plurality of inputs 165. The extra data event 190 provides an opportunity for an end user to add additional tasks to the plurality of inputs 165 representative of new objectives needed to complete and schedule management of the overall project. Just like data initially entered within the plurality of inputs 165, the extra data event may be presented as the task in a tabular form with a series of requirements in the proceeding columns (time, equipment, cost, etc.). The newly entered data of the extra data event 190 is then sent to the data validation module 175 to validate the correctness of the newly entered event data.

Entries into each of the data modification event 185 and the extra data event 190 are considered to be exogenous disturbances. These exogenous disturbances cause deviations from the initial calculation of the maximized rate of return of the overall project. The exogenous disturbances are considered to be physical, quantitative events that affect the underlying timeline, schedule, or cost of the total project (i.e. an equipment malfunction requiring repair, labor work force less than needed, cost of raw material greater than budget). The inventive nature of the resource optimization system 100 allows for the addition of these exogenous disturbances while the project is in progress and adjusts the remaining tasks and timelines as needed to provide the most direct route of the maximum rate of return for project costs and resources.

In the optimization phase 130 of the data processing layer 120, the actual calculations, comparisons, and data processing 195 of the optimization module 170 are performed. The resource optimization tool 150, which contains the optimization module 170, may take the form of one or more computing devices. The computing devices may include hardware components and software components configured to carry out one or more of the disclosed functions. The resource optimization tool 150 may include a network interface to facilitate access to plurality of inputs 165 and the plurality of personal computing devices 140 via a wireless network connection, a wired network connection, and/or a system bus. The resource optimization tool 150 may include one or more network interfaces, a processing unit, and a data storage, all of which may be communicatively linked by a system bus, network, or other connection mechanism. The resource optimization tool 150 may include various other components as well. Further, these components could be included within single computing device (e.g., a single server) or could be distributed across a plurality of computing devices (e.g., a plurality of servers).

Each network interface may be configured to enable communication with the resource optimization tool 150 and the plurality of personal computing devices 140. As such, network interfaces may take any suitable form for carrying out these functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. Network interface may also include multiple network interfaces. Other configurations are possible as well.

The processing unit of the resource optimization tool 150 may comprise one or more processor components, such as general-purpose processors (e.g., a single-core or multi-core microprocessor), special-purpose processors (e.g., an application-specific integrated circuit or digital-signal processor), programmable-logic devices (e.g., a field programmable gate array), and/or any other processor components now known or later developed. Processing unit may be integrated in whole or in part with other components of the resource optimization tool 150.

The data storage may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The data storage may also be integrated in whole or in part with other components of the training system. Further the data storage may be located local to the resource optimization tool 150 or remotely. The data storage may be placed on a database, web server, cloud, virtual machines, or the like. The data storage may be provisioned with software components that enable the resource optimization tool 150 to carry out the innovative functions disclosed herein.

After the optimization module 170 performs the necessary data processing 195, calculations, and comparisons, an optimized result 200 is obtained and transmitted to the output stage 135 of the data processing layer 120. The optimized result 200 is then transmitted back to the end user through the plurality of personal computing devices 140 connected to the resource optimization system 100. The optimized result 200 can then be displayed on a graphical user interface of each of the plurality of personal computing devices 140. In one format, the optimized result 200 may be displayed in a tabular format 205 on the graphical user interface that is similar to the plurality of inputs 165 originally entered into the resource optimization system 100. In other embodiments, the optimized result 200 may additionally contain graphics 210 used in conjunction with the tabular format 205 to give the end user an early visual representation of the optimized result 200. When viewing the optimized result 200, the end user on the personal computing device 145 can then make the necessary changes and determinations needed to make sure that the required course of action is implemented and followed so that the project progresses on the ideal course, which provides the maximum rate of return of the project's physical resources.

Figure 2:
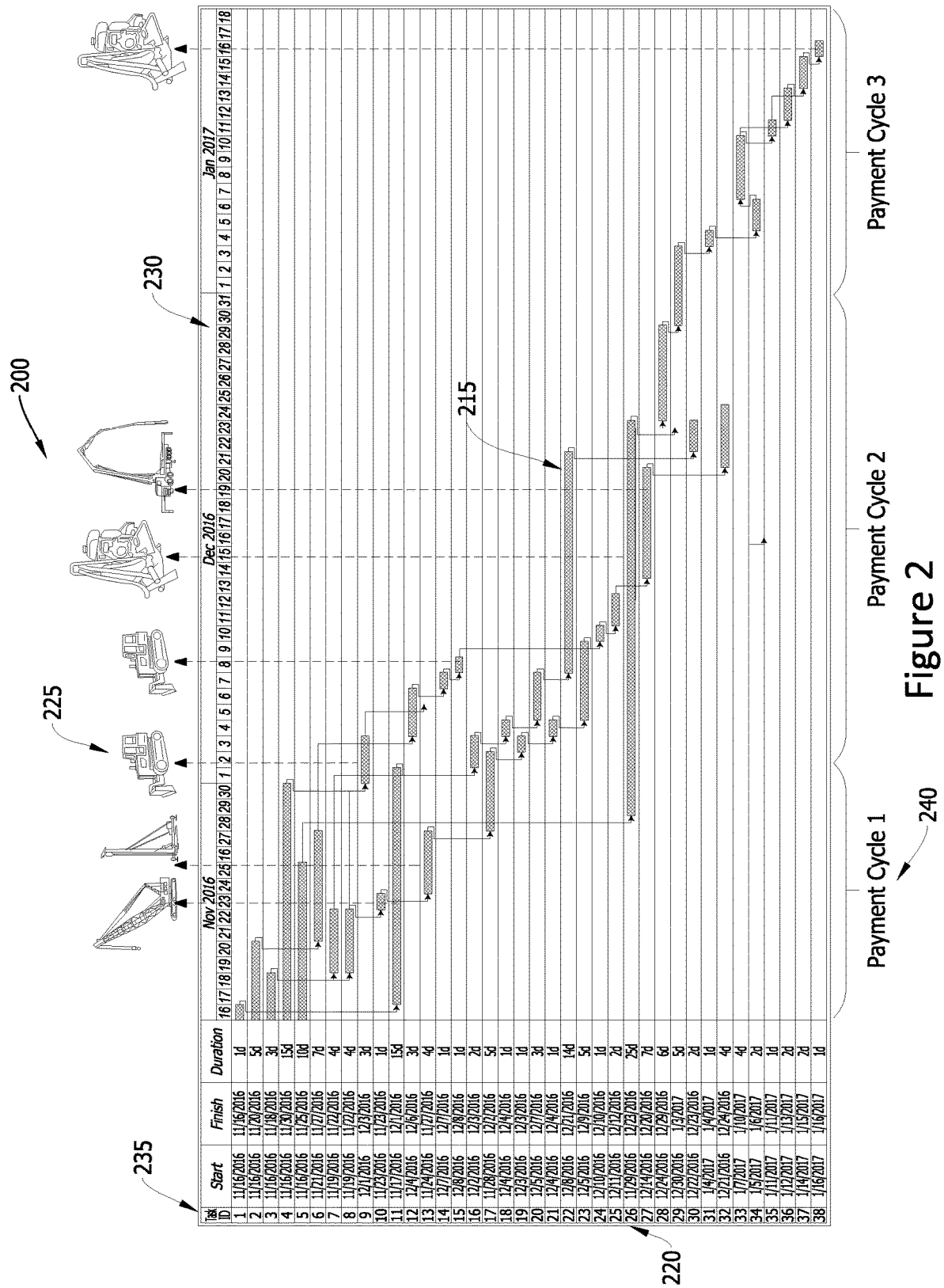
FIG. 2 illustrates an example tabular and graphical output of the resource optimization system according to an example embodiment.

Turning now to FIG. 2, and example optimized result 200 if viewed. The optimized result 200 shown here represent examples of physical equipment employed during the project execution process. The optimized result 200 is the result of the resource optimization tool 150 optimizing the plurality of inputs 165 to obtain a course of action to provide the maximum rate of return for the project. As seen in FIG. 2, time bars 215 are easily viewed representing the associated length of time allotted for an identified task 220. Some of these time bars 215 are connected to an equipment device 225 representing a date and duration of time in which the equipment device 225 is needed onsite for completion of the identified task 220. The optimized result 200 provides a calendar view 230 of all days inclusive within the sequential task listing 235. The calendar view 230 can be further disseminated into payment cycles 240 indicating the time period when payment of the project may come due. Representing the optimized result 200 in the tabular view with graphics provides an easily understood reference tool for the project manager or project management team. The end user can then use this tabular view with graphics to easily identify any problems with scheduling and cost for the overall project and then make the needed adjustments.

Figure 3:
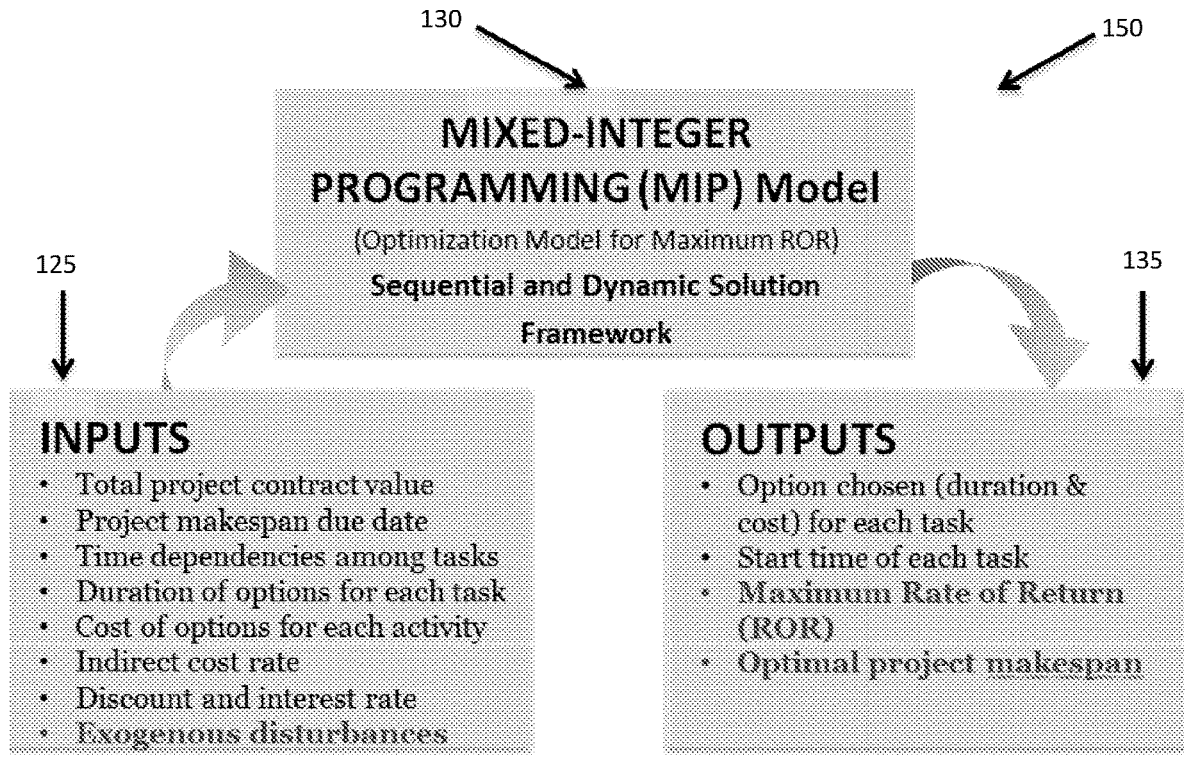
FIG. 3 illustrates a high level flow path of the resource optimization tool according to an example embodiment.

FIG. 3 represents and a high level view of the resource optimization tool 150. Similar to FIG. 1, the input phase 125, optimization phase 130, and the output phase 135 are shown. An example list of task data information is show, which can be used as a plurality of inputs 165 for the optimization module 170. These inputs include, but are not limited to: 1) total project contract value; 2) project make span due dates; 3) duration of options for each task; 4) cost of options for each activity; 5) indirect cost rate; 6) discount and interest rate; and 7) exogenous disturbances. Each of these plurality of inputs 165 is transferred into the optimization module 170. As discussed above, the optimization module 170 is a mixed-integer programming module configured to maximize the rate of return on resources allocated for a project. The optimization module 170 calculates and determines an optimized result 200, which can be seen as a series of outputs in either a tabular or graphical form on the graphical user interface accessed by an end user. This series of outputs may include but is not limited to: 1) options chosen (duration and cost) for each task; 2) start time of each task; 3) maximum rate of return (ROR); and 4) optimal project make span.

Figure 4:
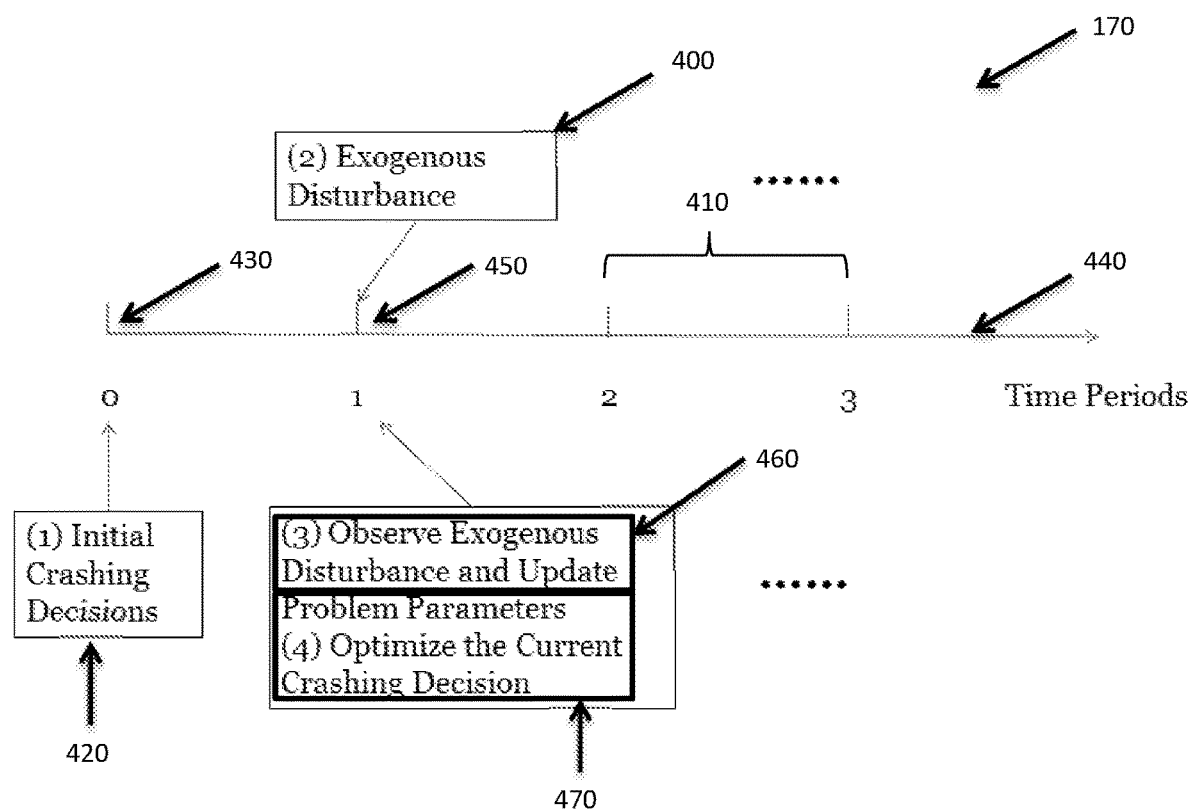
FIG. 4 illustrates a sequential and adaptive framework schematic of the optimization module according to an example embodiment.

FIG. 4 represents a visual view as to how the optimization module 170 creates an optimized result 200 and then can update that optimized result 200 based on an outside action, or an exogenous disturbance 400. The optimization module 170 works off a sequential framework. When the task data components of the plurality of inputs 165 are initially entered into the optimization module 170 a first optimization result 420 is returned and outputted. This first optimization result 420 could be an initial crashing decision, meaning deviations from the task data components during actual completion of the project will "crash" or find the first optimization result 420 to be false and therefore not an accurate representation of the progress or completion of the project. To address fluctuations that may occur when a project is in progress, the optimization module 170 also provides an adaptive solution framework. As seen in FIG. 4, the first optimization result 420 is obtained at point zero 430 on the axis 440. This represents an initial crashing decision of the project based on the initial plurality of inputs 165 transmitted to the optimization module 170. At point one 450, or a sequential advancement of the optimization module 170, an exogenous disturbance 400 is detected by the optimization module 170. This exogenous disturbance 400 may be any type of physically quantifiable event, which would cause the task data components of the plurality of inputs 165 to change, thereby rendering the first optimization result 420 incorrect. Once the exogenous disturbance 400 is observed within the optimization module 170 at block 460, the problem parameters, sets, or constraints of the optimization module 170 are updated accordingly at point one 450. The optimization module 170 then processes this exogenous disturbance 400 by processing the new task data components, which resulted from the exogenous disturbance 400. Then a second optimization result 470 is returned based on the inclusion of the exogenous disturbance 400. This second optimization result 470 would be an optimization of the initial crashing decision, or first optimization result 420, to create a current crashing decision based on the exogenous disturbance 400. Similarly, at points two, three, four, etc. of the sequence new or additional exogenous disturbances may be added to the optimization module 170. This in turn, by following the above steps, will result in a second, third, fourth, etc. optimization result replacing the previous optimization result. Configuring the optimization module 170 in this manner allows for seemingly minor changes in physical quantifiable events (i.e. cost overrun, change in labor force) to be assessed against the entire project to determine the most cost effective and advantageous use of resources moving forward to complete the project. The optimization module 170 is envisioned to be used in solving real world project scenarios, such as large scale construction projects or portfolio management of assets. Using the sequential and adaptive framework of the optimization module 170, the optimization module 170 is envisioned to address four real world scenarios: 1) analysis before the project starts; 2) above cost and ahead of schedule situations while the project is in progress; 3) above cost and behind schedule situations while the project is in progress; and 4) below cost and behind schedule situations while the project is in progress. Use of the optimization module 170 will allow the end user (project manager or project management team) the ability to adjust costs and correct errors so that the project completion timeline can conform to the desired outcome set forth at the beginning of the project.

The optimization module 170 provides for an integrated solution framework that supports the dynamic update of input data. These updates can be considered the exogenous disturbances 400 addressed above. Further, these updates can entered in the input phase 125 of the resource optimization system 100 through either the data modification event 185 or the extra data event 190 by the end user. What follows is a non-limiting example of the data updating procedures, which are present within the resource optimization system 100. In the optimization module of the resource optimization system, the productivity e(S) of crew S is considered as a function of the crew size δ and the exogenous random disturbance 400 ε. That is, e(S)=f(δ,ε), where f(•) is the function, often nonlinear, to describe such a relationship. At each decision point (point zero, one, two, three, etc.) during project execution, task data components regarding the project's progress and cost are observed and collected at the input phase 125 of the data processing layer 120, which are then used to estimate the functional form for f(•) through nonlinear regression. Next one pair of (cost$_i$, dur$_i$) of task i can be computed as follows:

$$dur_i = L_i / \bar{f}(\delta) \quad (1)$$

$$cost_i = c \cdot dur_i \cdot h \cdot \delta \quad (2)$$

Given crew size δ, equation (1) computes the duration (in days) of i by dividing the total workload $L_i$ (in units) by the estimated productivity $\bar{f}(\delta)$ in units/day.

Equation (2) computes the corresponding cost of i by multiplying the wage rate c per labor hour with the total required labor hours $dur_i \cdot h \cdot \delta$, where h is the number of working hours per day per crew.

To get a set $K_i$ of discrete modes (duration-cost pairs) for task i, repeat (1) and (2) $|K_i|$ times, by varying the value of crew size δ. By processing the above equations with the optimization module 170, the optimization result outputted will be representative of the duration-cost pair most likely to maximize the return on resources for overall project advancement.

The resource optimization tool 150 of the resource optimization system 100 applies a state-of-the-art integer programming solver, called CPLEX (ILOG CPLEX 12.6.3 User's Manual, IBM), to optimally solve the optimization module 170 in the center of the software architecture. The use and choice of CPLEX is not mandatary. There are number of other competitive out-of-shelf integer programming solvers available, such as Gurobi 2016 (*Gurobi Optimizer Reference Manual*, Gurobi Inc.), Xpress (*Xpress-Mosel User Guide*, Fair Isaac Corporation), etc., which have all implemented the efficient branch-and-bound and branch-and-cut methods of integer programming.

Figure 5:
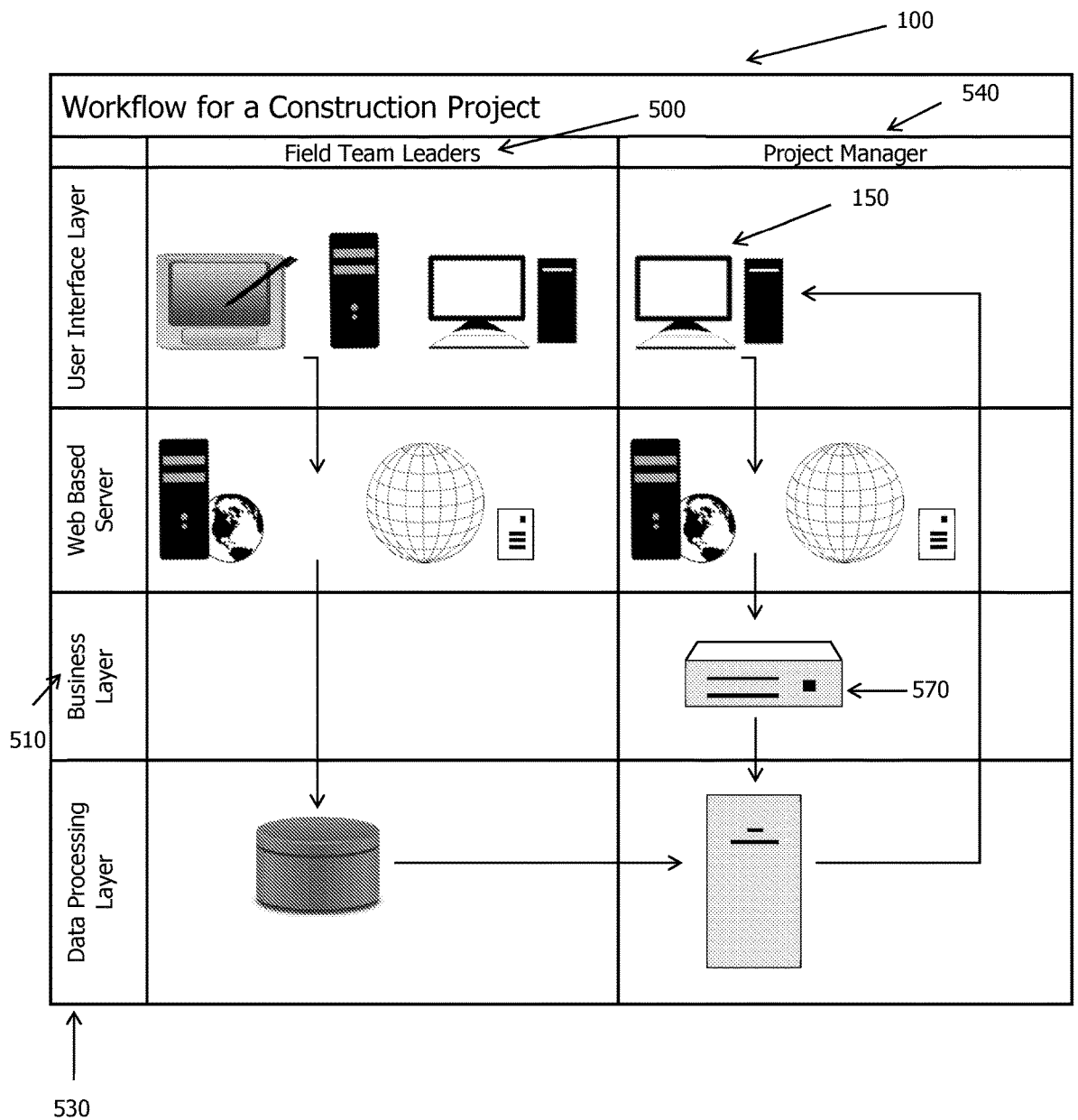
FIG. 5 illustrates a workflow schematic of the resource optimization system for use in managing a construction project according to an example embodiment.

As discussed above, the resource optimization system 100 was developed for use with large scale management projects. One example of these large scale management projects occurs in the construction industry. FIG. 5 shows how the resource optimization system 100 functions in the workflow of a typical construction project. Multiple field team leaders 500 on the construction site can connect to the resource optimization system 100 through the web based server 510. The field team leaders 500 may be able to input resource utilization and project schedule information through their personal computing devices 520 (i.e. personal computers, laptops, tablets, or smartphones) into the data processing layer 530 based on the worksite conditions they observe. This information makes up the exogenous disturbances 400 or changes to the initial plurality of inputs 165. The representative task data components are stored in a database 570 hosted on the web-based server 510 to be updated on a continuing basis. The project manager 540 may have an additional personal computing device 550, which may connect to the resource optimization system 100. The project manager 540 may input from his/her personal computing device 550, or equivalent, the business rules e.g. payment terms, constraints such as project deadline, and other data e.g. interest rate, overhead cost rate, into the resource optimization system 100 to instantiate and update the resource optimization tool 150 maintained on the hard-drive or cloud. Unlike the field team leaders 500, the project manager 540 is not required to be on site to evaluate and input changes to the resource optimization system 100. The updated resource optimization tool 150, with the task data components fed from the database, is then solved to generate optimization results via computing processors within the resource optimization system 100. The output results and reports are shown at the Project Manager's personal computing device 550.

Figure 6:
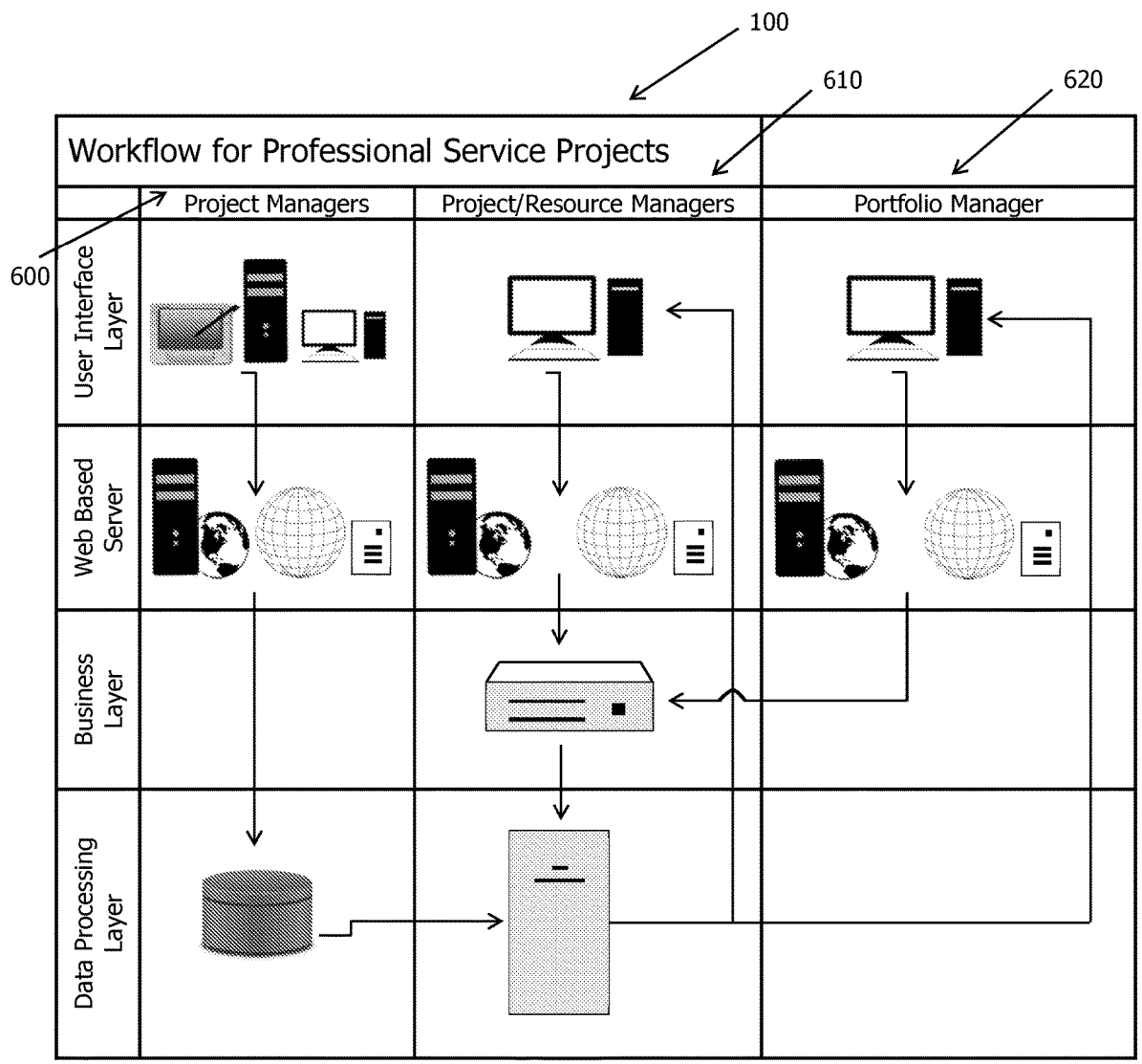
FIG. 6 illustrates a workflow schematic of the resource optimization system for use in managing a portfolio of a professional service project according to an example embodiment.

FIG. 6 shows another illustrative embodiment where the resource optimization system 100 may be employed. In FIG. 6, the workflow for managing a portfolio of a professional service project is viewed. This is a more complex environment where the company or organization needs to manage resource allocation and scheduling for multiple projects in its portfolio. Multiple project managers 600 often need to coordinate with the resource manager(s) 610 in this decision process. Then at the higher level, the portfolio manager 620 may come into play, who oversees the budgeting and resource allocation of the entire portfolio of projects. The workflow starts with project managers' input of project progress, resource working hours, and billing information into the plurality of inputs 165 of the resource optimization system 100. At the same time, project or resource managers (600 or 610) specify business rules and constraints to setup and update the resource optimization tool; some constraints or requirements, e.g. the overall budget of the entire portfolio, may come from the Portfolio Manager's end 620. Output reports are supplied to all end user personal computing devices of project managers 600, resource manager(s) 610, and portfolio manager 620.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting Thus, the breadth and scope of the present invention should not be limited by any of the above-described exemplary embodiments, but should be defined only in accordance with the following claims appended hereto and their equivalents.

What is claimed is:

1. A computer-based resource optimization tool for use in adaptive, computer-optimized managing of projects, the resource optimization tool comprising (i) a network interface, (ii) a plurality of distributed computing devices in operative networked communication with one another via the network interface, and (iii) a processor and a non-transitory computer-readable recording medium having stored thereon executable instructions which, when executed by the processor, configure and cause the resource optimization tool to:

process a plurality of inputs identified as requirements to complete a project, each of the plurality of inputs being representative of at least one task associated with the project and inputted as input data into the resource optimization tool;

operate as an optimization module that is configured to perform, at an initial point of the project, a first data processing procedure on a task data component of each of the plurality of inputs, the network interface being configured such that a plurality of network-connected personal computing devices associated with the resource optimization tool are in operative networked communication with the resource optimization tool via the network interface, the optimization module configured to return a first optimization result based on the first data processing procedure; and while the project is in progress, detect and sequentially process an exogenous disturbance inputted into the optimization module at a subsequent point during the project different from the initial point, the exogenous disturbance being a quantifiable event directly changing at least one of the task data components of the plurality of inputs associated with the project and having been entered into the resource optimization tool via receipt and processing by the resource optimization tool of an electronic transmission including data representing the exogenous disturbance from one or more of the plurality of network-connected personal computing devices using the network interfaces, the optimization module configured to perform a second data processing procedure on the exogenous disturbance and to return a second optimization result, the second optimization result being based on the exogenous disturbance and the second data processing procedure and representing an optimization of the first optimization result, wherein the resource optimization tool is configured to replace the first optimization result with the second optimization result to facilitate dynamic updating of data associated with the requirements to complete the project, and wherein the first and second optimization results are a maximum rate of return on the plurality of inputs inputted into the resource optimization tool, the second optimization result representing an updated and optimized maximum rate of return relative to the maximum rate of return of the first optimization result.

2. The resource optimization tool of claim 1, wherein the executable instructions, when executed by the processor, further configure and cause the resource optimization tool to contain a business layer and a data processing layer, the optimization module being located within the business layer and the first and second data processing procedures being performed within the data processing layer.

3. The resource optimization tool of claim 2, wherein the plurality of inputs are entered, uploaded, or manually inputted by a user into the optimization module within the business layer.

4. The resource optimization tool of claim 2, wherein an input for the exogenous disturbance is contained within the data processing layer, the exogenous disturbance being a data modification event to the plurality of inputs or an extra data event adding to the plurality of inputs entered into the resource optimization tool by a user.

5. The resource optimization tool of claim 2, wherein the exogenous disturbance inputted in the data processing layer, or the plurality of inputs, is/are transmitted to a data validation module of the resource optimization tool before transmission to the optimization module.

6. The resource optimization tool of claim 5, wherein the data validation module contains an exception handler to verify correct importation of data received by the plurality of inputs or the exogenous disturbance.

7. The resource optimization tool of claim 1, wherein the at least one task associated with the project is selected from the group consisting of an equipment requirement, a time requirement, a cost requirement, and a labor requirement.

8. The resource optimization tool of claim 7, wherein the equipment requirement is selected from a group consisting of a pile driver, a crane, a bulldozer, a gas engine vibrator, and a concrete pump.

9. The resource optimization tool of claim 1, wherein the optimization module returns both the first optimization result and the second optimization result in either a tabular format or a graphical tabular format.

10. A computer-based resource optimization system for use in adaptive, computer-optimized managing of a large scale project, the resource optimization system comprising (i) a network interface, (ii) a plurality of distributed computing devices in operative networked communication with one another via the network interface, and (iii) a processor and a non-transitory computer-readable recording medium having stored thereon executable instructions which, when executed by the processor, configure and cause the resource optimization system to:

operate as a resource optimization tool configured to receive a plurality of inputs identified as requirements to complete the large scale project, each of the plurality of inputs being representative of at least one task associated with the large scale project and inputted into the resource optimization tool as input data for a first data processing procedure, the first data processing procedure comprising a task data component of each of the plurality of inputs being processed, each task data component being a physically quantifiable value of the at least one task relating to either a cost requirement, a time requirement, a labor requirement, or an equipment requirement of the large scale project;

operate as an optimization module that is configured to perform, at an initial point of the large scale project, the first data processing procedure on the task data components of each of the plurality of inputs received by the resource optimization tool, the network interface being configured such that a plurality of network-connected personal computing devices associated with the resource optimization tool are in operative networked communication with the resource optimization tool via the network interface, the optimization module configured to return a first optimization result based on the first data processing procedure, while the large scale project is in progress, detect and sequentially process an exogenous disturbance inputted into the optimization module within the resource optimization tool at a subsequent point during the large scale project different from the initial point, the exogenous disturbance being a quantifiable event directly changing at least one of the task data components of the plurality of inputs associated with the large scale project and having been entered into the resource optimization system via receipt and processing by the resource optimization tool of an electronic transmission including data representing the exogenous disturbance from one or more of the plurality of network-connected personal computing devices using the network interface, the exogenous disturbance relating to either the cost requirement, the time requirement, the labor requirement, or the equipment requirement relative to the quantifiable event, the optimization module further configured to perform a second data processing procedure performed on the exogenous disturbance and return a second optimization result, the second optimization result being based on the exogenous disturbance and the second data processing procedure and representing an optimization of the first optimization result, wherein the resource optimization tool is configured to replace the first optimization result with the second optimization result to facilitate dynamic updating of data associated with the requirements to complete the large scale project; and display a graphical user interface (GUI) in association with the resource optimization tool to allow an end user the ability to access, view, and edit the resource optimization tool as well as access, view, and edit the plurality of inputs, the GUI configured to receive and display each the first optimization result and the second optimization result to the end user accessing the GUI, wherein the first and second optimization results are a maximum rate of return on the plurality of inputs inputted into the resource optimization tool, the second optimization result representing an updated and optimized maximum rate of return relative to the maximum rate of return of the first optimization result.

11. The resource optimization system of claim 10, wherein the GUI is displayed on each of the plurality of network-connected personal computing devices operatively connected to the resource optimization tool.

12. The resource optimization system of claim 11, wherein the plurality of network-connected personal computing devices connect to an internet browser before accessing the resource optimization tool.

13. The resource optimization system of claim 12, wherein the internet browser reports a sign in authentication to the end user on a corresponding one of the plurality of network-connected personal computing devices, the sign in authentication requiring a security authorization for the end user to proceed to access the resource optimization tool on the corresponding one of the plurality of network-connected personal computing devices.

14. The resource optimization system of claim 10, wherein the optimization module returns both the first optimization result and the second optimization result in either a tabular format or a graphical tabular format to the end user.

15. The resource optimization system of claim 10, wherein the executable instructions, when executed by the processor, further configure and cause the resource optimization system to contain a user interface layer, a web server layer, a business layer and a data processing layer, the optimization module being located within the business layer and the first and second data processing procedures being performed within the data processing layer.

16. The resource optimization system of claim 15, wherein the data processing layer contains an input for the exogenous disturbance, the exogenous disturbance being a data modification event to the plurality of inputs or an extra data event adding to the plurality of inputs, each the data modification event and the extra data event being entered by the end user.

17. The resource optimization system of claim 10, wherein the large scale project is a construction project.

18. The resource optimization system of claim 10, wherein the large scale project is a professional service project.

19. A method of optimizing the workflow of a large scale project via adaptive computer-optimization using a computer-based resource optimization system comprising (i) a network interface, (ii) a plurality of distributed computing devices in operative networked communication with one another via the network interface, and (iii) a processor and a non-transitory computer-readable recording medium having stored thereon executable instructions which, when executed by the processor, configure and cause the resource optimization system to facilitate carrying out of the method, the method comprising:

accessing, by a user, the resource optimization system through a graphical user interface of the resource optimization system;

entering a plurality of inputs identified as requirements to complete the large scale project into the resource optimization system, each of the plurality of inputs being representative of at least one task associated with the large scale project;

receiving a task data component of each of the plurality of inputs as input data within a resource optimization tool of the resource optimization system;

executing, at an initial point of the large scale project, a first data processing procedure on at least one of the task data components with an optimization module of the resource optimization tool, the network interface being configured such that a plurality of network-connected personal computing devices associated with the resource optimization system are in operative networked communication with the resource optimization system via the network interface;

returning, with the optimization module, a first optimization result based on the first data processing procedure;

while the large scale project is in progress, entering, via one or more of the plurality of network-connected personal computing devices associated with the resource optimization system, an exogenous disturbance action into the resource optimization tool, the exogenous disturbance action being a quantifiable event directly changing at least one of the task data components of the plurality of inputs, the entering of the exogenous disturbance action being performed after receipt and processing by the resource optimization tool of an electronic transmission including data representing the exogenous disturbance action from the one or more of the plurality of network-connected personal computing devices using the network interface;

executing a second data processing procedure on the exogenous disturbance action with the optimization module;

returning, with the optimization module, a second optimization result based on the exogenous disturbance action and the second data processing procedure, the second optimization result representing an optimization of the first optimization result;

replacing the first optimization result with the second optimization result to facilitate dynamic updating of data associated with the requirements to complete the large scale project; and displaying each the first optimization result and the second optimization result on the graphical user interface accessible by the user, wherein the first and second optimization results are a maximum rate of return on the plurality of inputs inputted into the resource optimization tool, the second optimization result representing an updated and optimized maximum rate of return relative to the maximum rate of return of the first optimization result.

* * * * *